United States Patent [19]

Granholm

[11] 4,237,375

[45] Dec. 2, 1980

[54] OPTO-ELECTRONIC APPARATUS FOR READING INFORMATION CONTAINED IN AN INFORMATION CARRIER

[75] Inventor: Carl Granholm, Hastings on Hudson, N.Y.

[73] Assignees: Firma Interlock Sicherheitssysteme GmbH, Stuttgart; Firma Interflex Datensysteme GmbH & Co. K.G., Weigheim, both of Fed. Rep. of Germany

[21] Appl. No.: 952,516

[22] Filed: Oct. 18, 1978

[30] Foreign Application Priority Data

Oct. 20, 1977 [DE] Fed. Rep. of Germany ....... 2747076

[51] Int. Cl.³ ....................... G06K 19/00; G06K 5/00; G06K 7/10
[52] U.S. Cl. ................................. 235/487; 235/437; 235/456; 235/466
[58] Field of Search ............... 235/437, 458, 462, 466, 235/468, 482, 491, 456; 250/566; 340/149 R, 149 A, 274 C, 147 MD; 200/46

[56] References Cited

U.S. PATENT DOCUMENTS

| | | | |
|---|---|---|---|
| 3,310,658 | 3/1967 | Ryer | 235/466 |
| 3,453,419 | 7/1969 | Torrey | 235/466 |
| 3,536,894 | 10/1970 | Travioli | 235/468 |
| 3,562,494 | 2/1971 | Schmidt | 235/466 |
| 3,829,662 | 8/1974 | Furahashi | 340/149 A |
| 3,852,572 | 12/1974 | Nicoud | 235/489 |
| 3,858,032 | 12/1974 | Scantlin | 235/487 |
| 3,976,857 | 8/1976 | Hogberg | 250/566 |

*Primary Examiner*—Robert M. Kilgore
*Attorney, Agent, or Firm*—Edwin E. Greigg

[57] ABSTRACT

An opto-electronic apparatus for reading out preferably coded information contained on a data carrier with high reliability and free of disturbances even when the insertion speed of the information carrier into an associated opening of the reading apparatus depends only on the arbitrary actuation by the operating person, including retrograde motions or stoppage of the information carrier. The apparatus is especially adapted to the read-out of information coded in a card as a pattern of alternating transparent and opaque areas which are subjected to infrared radiation whose passage or non-passage is detected by suitable detectors. The process of reading out the information contained in the data carrier is timed or clocked by a clock cycle generated from a clock track contained in the data carrier itself. The apparatus includes a program memory which contains stored information regarding the clock cycle to be expected and is thus able to read out the information contained on the data carrier without automatic mechanical transporting devices for passing the data carrier past the reading assemblies. Even if the manual insertion of the card of the data carrier includes generally unintended reverse motions, the circuit remembers the last clock cycle and continues to read the data at that point during subsequent forward motion, provided the reverse motion has not been excessive. The apparatus also provides the readout and status determination during standby operation with low power sensing pulses and a switchover to data read-out in the presence of the data carrier with high powered pulses of a current density which exceeds that normally acceptable to the light sources under continuous operation. In a preferred embodiment, the coded information on the data carrier is so distributed that, during the read-out of these data, a local clock sequence is generated automatically from the data itself without the requirement for a separate timing track.

28 Claims, 12 Drawing Figures

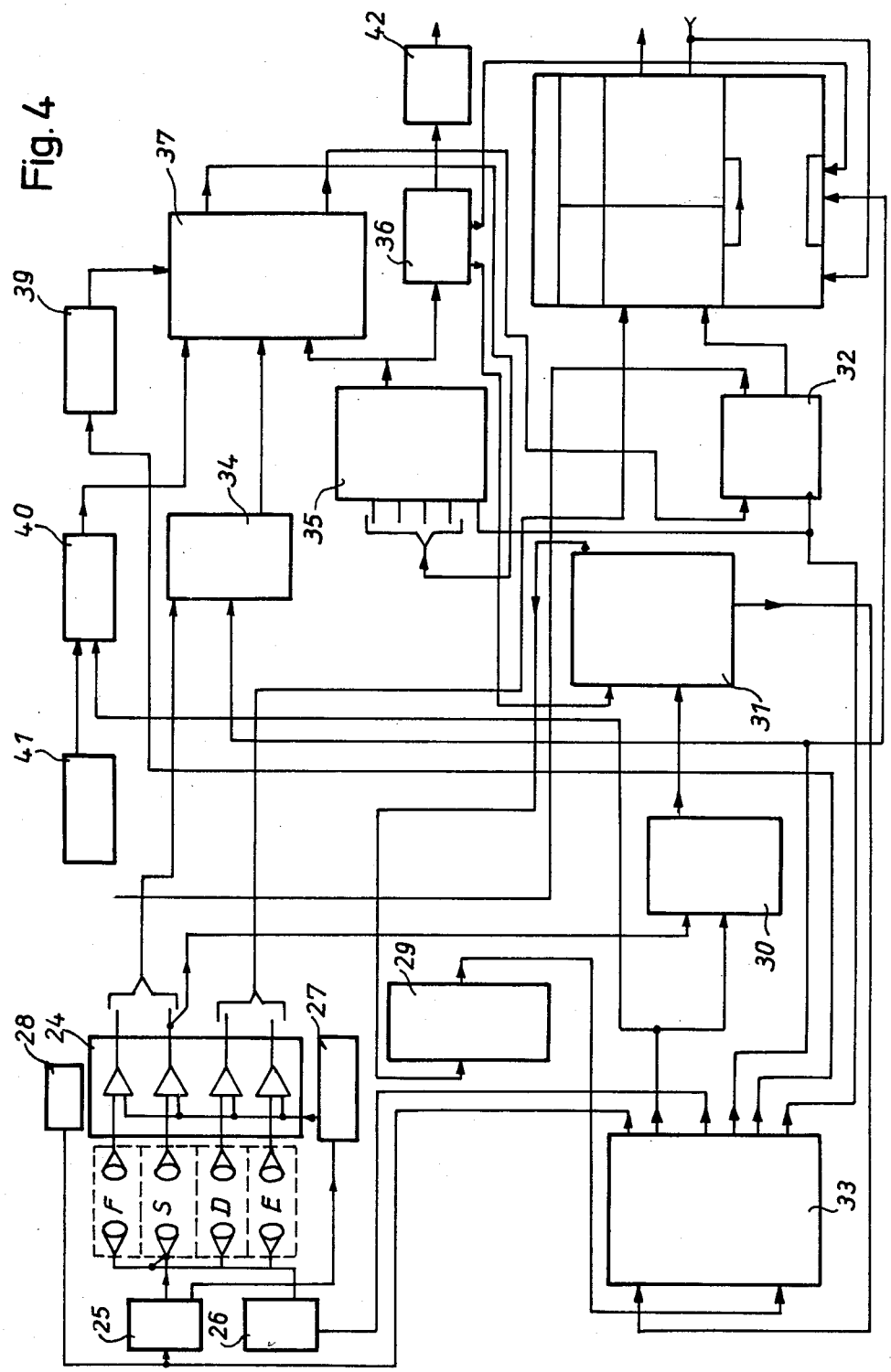

OPTO-ELECTRONIC APPARATUS FOR READING INFORMATION CONTAINED IN AN INFORMATION CARRIER

FIELD OF THE INVENTION

The invention relates to an opto-electronic information reader. More particularly, the invention relates to an opto-electronic apparatus for reading preferably coded information placed on an information carrier. In use, the information carrier is moved relative to reading heads or sensors. A particular field of application is the reading of coded cards having cover plates that are transparent substantially only to infrared light and between which are placed code sheets that define a sequence of alternatingly bright and dark, i.e., transparent and non-transparent, regions. The apparatus further includes at least one light source and a corresponding light receiver as well as electronic processor circuits.

BACKGROUND OF THE INVENTION

Known in the art, for example from the German Offenlegungsschrift 25 59 430, is an apparatus for testing identification cards or the like and employing for this purpose a photodiode. In order to prove the authenticity of the documents inserted into the verifier, use is made of special test elements constructed of compounds of rare earth elements which have the property to reflect or transmit impinging light with certain delays. The known apparatus exploits the delay characteristics of these elements for recognizing the authenticity of the inserted document. The known apparatus employs a pulse oscillator whose output signals pass through the special test elements and are then fed to a gate circuit belonging to a processor circuit. The opening of the gates is also made dependent on the output signals from the oscillator. If the pulses do not arrive at the gate circuit in a particular chronological sequence, they are rejected and an indication of non-authenticity of the inserted document is made. In the preferred exemplary embodiment of the known apparatus, the reading of the information in the document takes place while the coded card is stationary. Such static reading requires a very precise positioning of the document in its guide slot and any mechanical deformations or damage to the card must be prevented for correct operation. On the other hand, if a dynamic reader is used, the insertion speed must be precisely adjusted so as to prevent falsifications in the temporal occurrence of the test signals.

It is a further disadvantage of the known apparatus that only light of a specific wavelength may be used and that those regions which contain the test material must be transparent so that any soiling has to be avoided. Altogether, the known apparatus requires a substantial technical expenditure which is successful only if very particular conditions are met during the reading operation. In common usage, this is very often not the case so that the known apparatus is not sufficiently reliable and fool-proof in a very wide region of application.

It is further to be noted that information carriers, for example coded cards which contain invisible codes which are placed between only semi-transparent or weakly transparent cover sheets, require a substantial light intensity for correct reading. Accordingly, a suitable reader must have available to it a substantial amount of electric current, i.e., power. On the other hand, coded cards of this type are very popular due to their substantial resistance to forging and are widely used as credit cards, checking account cards and personal identification cards. All known opto-electronic readers for reading these cards employ the full operating power both during standby operation as well as during the reading operation and thus require considerable operating power at all times. They therefore must be supplied by a power source of substantially infinite capacity; for example, the commercial power grid, and the light sources normally employed, i.e., light-emitting photodiodes, are required to produce the maximum light intensity continuously. Accordingly, the known card readers are unsuitable for battery operation and, at the same time, have a relatively short operational lifetime.

Still another disadvantage of the known card readers is that they are usually provided with a mechanical card transport mechanism so as to guarantee a constant reading speed or pulse frequency during the admission of the card so that a well-defined coded bit stream of the stored data is obtained. These mechanical card transport mechanisms are subject to the common malfunctions of complicated mechanical systems.

OBJECT AND SUMMARY OF THE INVENTION

It is thus a principal object of the present invention to provide an opto-electronic apparatus for reading stored coded data of the general type described above but without requiring a mechanical card transport mechanism and operating at a substantially lower power than the apparatus known in the art. It is a concurrent object of the present invention to provide a reader with substantially greater lifetime of the reading head assembly than can be provided by any known reader. Still another object of the invention is to provide an information reader which may be used with commonly available storage batteries acting as power sources.

A principal feature of the invention resulting in the attainment of the aforementioned objects is the provision of an information-carrying element which has at least two data tracks of alternatingly light and dark spaces, one of these data tracks being associated with the generation of clock pulse train for coordinating the operation of the reading circuits and the other being a data-containing track. Associated with each of these tracks is a reading head assembly with separate light sources. The apparatus of the invention with the aforementioned characteristics and with the further characteristics to be described in detail below permits a relatively simple apparatus capable of large-scale integration and providing a high degree of immunity against disturbing influences. In particular, the reading process is substantially independent of external conditions and circumstances which occur virtually always during the insertion of a coded card or information carrier into a suitably equipped reading region. It is a particular advantage of the present invention that no mechanical carrier transport is used and that it is possible to accommodate even retrograde, i.e. reverse motions, of the information carrier without thereby disturbing or defeating the data reading process or generating errors in the processing of the read data.

It is a particular advantage of the present invention that the processing circuitry can be used in pulse operation both during standby and during the actual reading. Inasmuch as no coordinaton is expected or takes place between the insertion speed of the information carrier and the clocked operation in the pulse mode, no errors can occur because various circuit elements enter a standby mode or operate in a loop mode.

The standby operation of the apparatus is defined as that status when the reader is ready to operate but requires only a minimum standby power because only a simple circuit element, preferably only a single one of the plurality of reader heads, is actually operating and even this single head is operating only when relatively short and low power sensing pulses are present. Accordingly, the entire standby power is very low. On the other hand, even during the actual reading operation, the reading heads and possibly even the entire electronic supply and processing circuits also operate only in a pulsed mode, at a somewhat higher operating frequency than during standby operation and with a substantially higher pulse power, permitting the operation of the light-emitting diodes with substantially increased current and thus increased light intensity. Inasmuch as pulsed operation during the actual reading of the information carrier is possible, and the information carrier itself is provided with a clock generating track, it is possible to dispense with a continuous insertion mechanism for the card carrier. The clocking of the apparatus is provided by alternatingly light and dark spaces in a clock track which is interrogated by associated reading heads whose output signals provide a criterion for correct or incorrect insertion of the information carrier.

The power consumption of the apparatus is still further reduced by switching off any power-intensive portions of the circuit during standby operation and to operate the circuit during the reading of the data with clock pulses whose length need be only a fraction of the length of the reading pulses.

In a further development of the invention, the switch-over from standby operation to reading operation takes place automatically in dependence on the non-occurrence of a sensor pulse at at least one of the reading heads. Accordingly, the apparatus can switch automatically from standby operation to reading operation as soon as one of the reading heads which is operated intermittently detects a light-to-dark transition, i.e., as soon as a coded card or information carrier is inserted into the reader.

In order to prevent errors occurring from faulty insertion or other erroneous manipulations and to prevent the processing of forged information carriers, the invention further provides that the processor circuit contains a permanently stored clock pulse sequence program which is compared with a clock pulse sequence generated by a pair of clock reading heads that read the data contained on a clock track on the information carrier. The clock reading heads are separated from one another by a distance which is different from the distance between adjacent data points in the clock track of the information carrier. This particular disposition increases the general operational reliability and also prevents the processing of forged or otherwise unauthorized information carriers, in particular those which may have been tampered with.

In a further feature of the invention, the stored clock pulse sequence contains a sequence which corresponds to a correct insertion of the coded card or information carrier as well as another coded sequence corresponding to the correct removal of the coded card. The memory may still further contain different clock sequences, which vary in the type of pulse or the number of pulses or their distance and which are related to the limits of acceptability of which the processor circuit is capable.

By having a plurality of stored clock sequences, the card reader will not only recognize the optimum, i.e., correct, insertion and removal movements of the coded card, but may also respond to movements which differ from the ideal ones within certain limits, for example a somewhat irregular insertion or removal, while still permitting an error-free processing of the read-out information as long as the pulse sequence read from the card corresponds to one of the stored sequences. In practice, this means that the coded card does not have to be moved continuously into the card reader up to its stop but that the card reader will still respond correctly even if the coded card is temporarily arrested during insertion or even moved back slightly and then forward again.

It is a particular feature of the invention to prevent excessive power consumption of turning the system to standby operation after removal of the information carrier as well as after the recognition of an error.

An opto-electronic reader according to the present invention may be constructed with relatively simple elements which require only a relatively small space due to the disposition of the reading heads and the processing circuit on a plurality of stacked printed circuit cards disposed on either side of the channel which receives the information carrier.

The invention will be better understood as well as further objects and advantages thereof become more apparent from the ensuing detailed description of preferred exemplary embodiments taken in conjunction with the drawing.

BRIEF DESCRIPTION OF THE DRAWING

FIG. 4 is a block circuit diagram of a first exemplary embodiment of the invention;

DETAILED DESCRIPTION OF THE PREFERRED EMBODIMENTS

Figure 1:
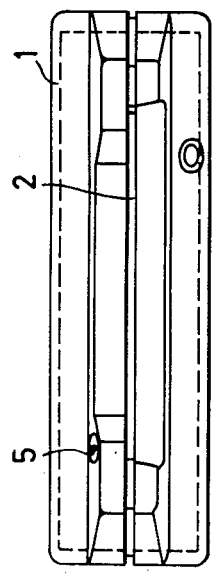
FIG. 1 is a front elevational view of a card reader according to the invention.
Figure 2:
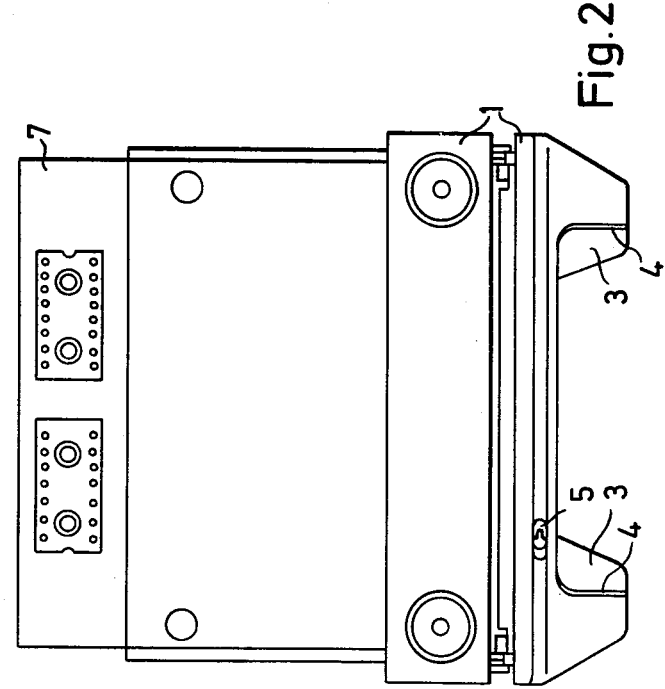
FIG. 2 is a top view of the apparatus of FIG. 1.
Figure 3:
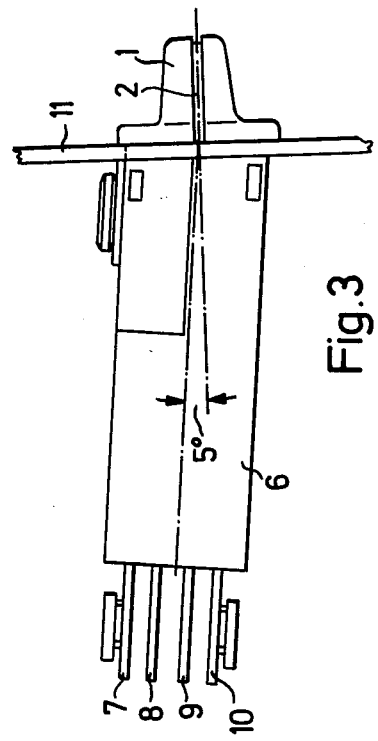
FIG. 3 is a side view of the apparatus of FIG. 1.

The overall construction of the information reader according to the present invention includes a frontal frame 1 having a slot 2 for receiving an information carrier, for example a coded card, and equipped with lower and lateral guide surfaces 3 and 4 for insuring the correct insertion and withdrawal of the coded card. An error indicating signal lamp 5 is provided to alert a user to faulty operation of the apparatus. The rear portion of the card reader is provided with a protective housing 6 which holds a total of 4 printed circuit boards 7, 8, 9 and 10, which are fastened within the frontal frame 1 in such a manner as to lie in a plane inclined by approximately 5° from the plane defined by the insertion slot 2. The inclination of the circuit boards is provided to prevent the intrusion of light from the outside into the interior of the card guide channel formed by the interior circuit boards 8 and 9. FIG. 3 further illustrates how the apparatus may be mounted in the bezel plate 11 of some frame or housing, not further shown.

Figure 5:
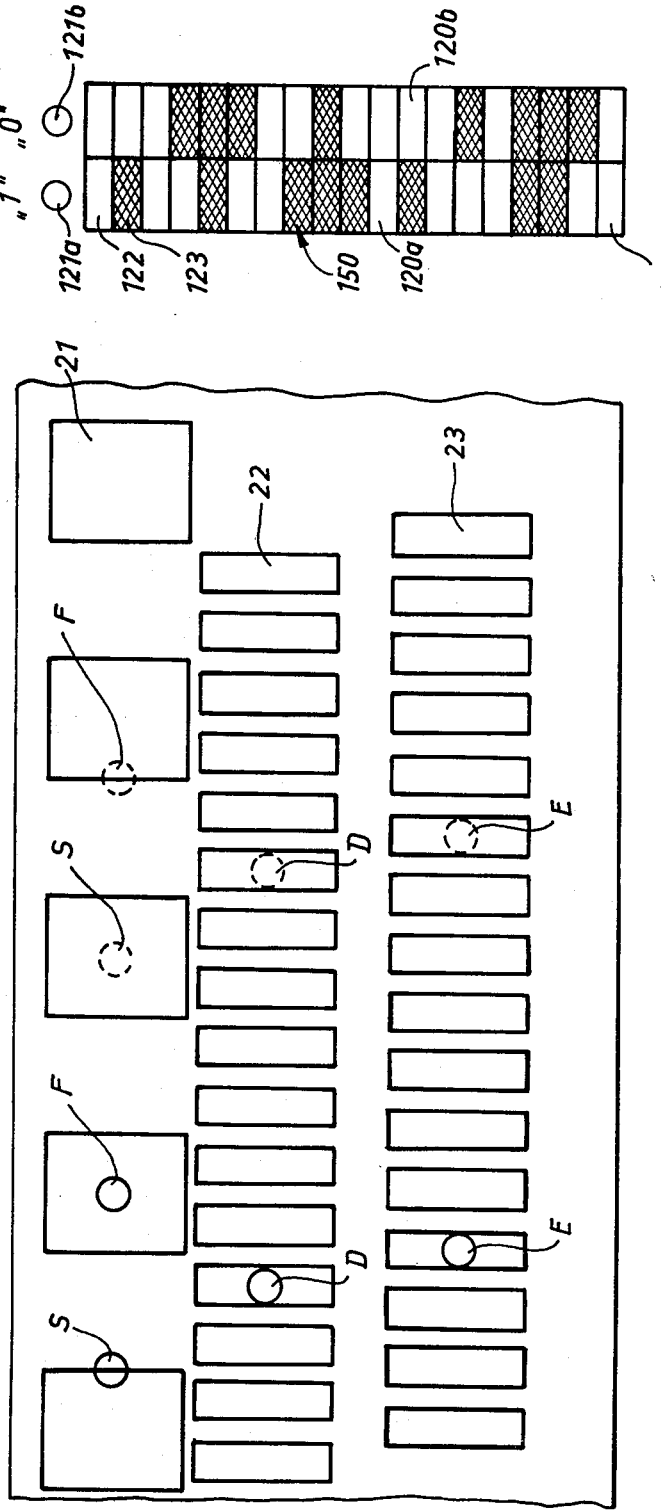
FIG. 5 is a partial illustration of an information carrier, embodied as a code-carrying card with data and clock tracks.

The information carrier whose information is to be read out by the apparatus according to the present invention is illustrated in one exemplary embodiment in FIG. 5 as a coded card which may consist, for example, of three substantially parallel and permanently joined foils. The upper and lower foils consist preferably of a material that is transparent only to infrared light and is of such a strength as to give to the coded card the required stiffness and rigidity. The central foil constitutes the actual code or data carrier and it is made of an opaque material in which the data or codes are formed by sequential rectangular openings disposed in a particular pattern. The alternating bright and dark fields of the code track 21 constitute a clocking track, whereas the smaller rectangles in rows 22 and 23, in the present example 16 rectangles per track, constitute the actual information bits and represent particular binary words depending on their combination. It will be noted from FIG. 5 that the individual openings 17, 18 and 19 in the clocking track are separated from another by a distance corresponding to their own width whereas the openings in the data track 22 are of such a width that two of such openings lie directly underneath each of the openings 17, 18, 19, while two adjacent of the smaller rectangles in the data track 22 come to lie underneath the opaque part of the clocking track 21. It will be further noted that the data bits of the second data track 23 are displaced with respect to those of the data track 22 by one-half width of one of the small data openings.

Shown schematically in FIG. 5 are two data-reading heads S and F whose separation in the long direction of the data card is seen to be unequal to the separation of alternating light and dark fields; in the present example, that separation is about one and a half times as large as the distance between adjacent clocking track openings. It will be appreciated that, when the coded card is inserted into the reader, there will be produced in the reading heads S and F two separate pulse trains of substantially rectangular shape but with a relative phase difference equal to one-half pulse width. By an examination of these two phase-shifted pulse trains in coordination with the data contained in the data tracks 22, 23, it is possible to distinguish correct card insertions from those which occur too rapidly or too slowly or are, in some manner, excessively irregular.

FIG. 4 is a block circuit diagram of the essential components of the data processing circuit, containing the electronic circuitry of the card reader which would be disposed on the printed circuit boards 7, 8 and 9. The blocks shown in FIG. 4 constitute functionally associated circuit groups.

The card reader of the present exemplary embodiment is seen to include a total of four reading head assemblies, each consisting of a light-emitting photodiode and a light-sensitive phototransistor, and respectively labeled F, S, D and E. The outputs of these reading head assemblies are connected to a comparator 24 serving at the same time as an amplifier and including adjustable thresholds provided by a threshold switch 27. The comparator 24 is further engaged by an amplifier 28. All four of the light-emitting photodiodes in the four reading head assemblies are connected to a high power switch 26. Additionally, the light emitting diode associated with the reading head 7 is also connected to a low power switch 25 whose output signal also goes to the aforementioned threshold switch 27. The low and high power switches 25 and 26 are controlled by separate outputs of a pulse selection processor 33, the amplifier 28 being connected to the same output of that processor as is the low power switch 25. Further included in the processor circuit of FIG. 4 is a multi-phase oscillator 29, a card recognition register 30, a status register 31, a synchronizing circuit 32, a clock register 34, a status counter 35, a status decoder 36, a program memory 37 for storing particular pulse sequences in the clocking track, a memory 38, a power switch 39 for the program memory 37, an error switch 40 for shutting off the program memory when a legitimate card is inserted erroneously or when an illegitimate card is inserted, a speed sensor which senses the speed of insertion of the coded card and which activates the error switch 40 in association with one output of the processor 33, and a buffer 42 engaged by the status decoder 36 for the purpose of generating status signals and error signals.

The various pulse trains generated by the multiphase oscillator 29 serve as sensing and reading pulse trains as well as for clocking the system. It is the purpose of the pulse selecting processor 33 to use the pulse trains generated by the multi-phase oscillator 29 and to pass them on, according to the various operational states and according to a predetermined program, to the light-emitting diodes of the four reading heads as well as to the other circuit groups of the apparatus. The circuit 33 is controlled by the status register 31 which also engages the multi-phase oscillator and which is itself controlled by the card recognition register 30 and the status decoder 36. The input of the card recognition register 30 is connected firstly to the output of the comparator 24 associated with the reading head S which operates during standby operation as well as to one control output of the processor 33 which signalizes the fact that a coded card is present in the card reader. The status register 31 can distinguish between various states of the system, namely standby operation, card reading, card reading completed, as well as reading operation and error status.

The status counter 35 is also cycled by the multiphase oscillator 29 via the processor 33 and its input is connected to the program storage 37 while its output is connected to the status decoder 36 and to the program storage 37. The timing or clocking track register 34 is connected at its input to the outputs of the comparator 24 associated with the clock track reading heads F and S and, at the same time, to the output of the processor 33 for the purpose of synchronizing or rastering while its output goes to the program storage circuit 37.

The stored information associated with a particular card reader is stored in the data memory 38 whose inputs are connected to the multi-phase oscillator 29 acting via the processor 33. These stored data are used for a comparison and/or identification with the data read from the information carrier, i.e., the coded card. The data stored on the coded cards in binary code is read by the two reading heads D and F and is fed to the data memory 38 for a comparison with the stored data.

The card reader described so far functions as follows. In standby operation, i.e., when no coded card is present in the card reader, the diode associated with the reading head S is supplied, for example, with pulses having a duration of 20 ms and an intensity of 10 mA. Depending on the application, the time between pulses can be relatively rapid so as to recognize the presence of an inserted card or can be relatively long but, in any case, of a duration which insures that the duty cycle is substantially less than continuous operation. Each pulse also switches on the comparator-amplifier combination 24. When no coded card is present, the phototransistor associated with the reading head S receives the light pulse generated by the associated diode and generates a voltage which is at least two to three times as high as the threshold of the comparator. Accordingly, the comparator output associated with the reading head S switches over to indicate the condition "bright". The negative-going edge of this pulse triggers the card recognition register 30 indicating that no card is present. This whole cycle is repeated after the expiration of approximately 1 to 5 ms. The average current consumption or power consumption is very low because the circuitry is switched on only for a very short time. Furthermore, a capacitor connected to the power supply acts as a power reserve for providing the sensing pulses so that the power supply is required to provide only the average current which, depending on the duty cycle, may lie, for example between 150 $\mu$A and 1 mA. This very low power consumption makes it possible to use the card reader with batteries acting as power supplies.

When a coded card is inserted into the reader, the apparatus switches over automatically from standby operation to reading. The insertion of the coded card causes the next light pulse in the reading head S to be interrupted so that it cannot reach the phototransistor of the reading head S. The card recognition register thus recognizes the presence of a coded card and switches over to the card-reading operation status at least when, for example, the negative-going edge of the pulse from the pulse selection processor 33 is also received. This triggers a pulse lasting approximately 20 ms which serves to apply relatively high reading power to the light-emitting diodes. As a consequence, all four of the light emitting diodes of the reading heads F, S, D, E are supplied with pulses of between 100 and 400 mA causing the emitted light intensity to be so high that it can pass through cards having a transparency of less than 1 percent. During the further insertion of the card, the phototransistors respond to the presence or absence of the opaque and transparent portions, i.e., the coded information in the central foil, and generate appropriate pulse trains which are amplified by the comparator-amplifier combination 24. The clocking or timing pulses are applied to the timing track register 34 and are then fed to the program memory 37. The data track signals are fed into the data storage memory 38. The various negative-going edges of these pulse trains alter the logical states in the timing register 34 and they also actuate the status program in the program memory 37. On the basis of the received information, the program memory 37 makes a decision as to whether a proper and legitimate coded card was inserted. After the expiration of approximately 200 $\mu$s, the light pulses are repeated, beginning with a low-powered pulse applied via the low power switch 25 to the reading head S to check the presence or absence of a card. Subsequently, a high-powered pulse is applied to all four reading heads to read the code contained on the card. During the reading operation, the power is turned on for approximately 10 percent of the time resulting in an overall power consumption of approximately 120 mA. When the card is removed from the apparatus, the entire system returns to standby operation.

The program memory 37 contains the overall function and status program of the card reader. The memory 37 receives the timing data read from the inserted card and compares it with the stored system status data in the status counter 35 which includes a sub-status register. When the physical position of the card is changed drastically, the program memory 37 writes a new status into the sub-status register of the status counter 35. During each reading cycle, the program memory 37 needs to be turned on only for approximately 1 or 2 $\mu$s. During the reading operation, its average power consumption is approximately 1.5 mA. Preferably, the status counter 35 and the sub-status register contained therein is embodied in CMOS-logic and thus stores data with very low power consumption. This CMOS circuit is advantageously coupled with a PROM acting as the program memory 37 and embodied as a Schottky-type circuit which is turned on only for very short periods of time.

The status counter 35 and the sub-status register contained therein store the position of the card at all times so that changes in that position can be compared and processed. The PROM 37 compares the data of the changed position of the card with the stored data of the previous position and causes a phase shift of 90° to check if the card is being inserted or removed. The PROM 37 also decides if any return motion of the card during insertion is greater than an acceptable amount, in the present exemplary embodiment greater than 3 bits, which would constitute an error, and also if the card has been inserted beyond the previous point of insertion. The alternating occurrence of light and dark regions and the concurrent generation of logically high (1) or logically low (0) states at the reading heads F and S are checked to determine whether their sequence constitutes a further advance of the coded card, in which case the read bits in the data tracks are stored in the memory 38. When the card is fully inserted, that status is recognized as a "completely read" status and the high power pulse sequence is turned off. If the card is accidentally reversed beyond the acceptable amount prior to being fully inserted and before the reading operation is complete, the high powered pulses are also turned off and the error indicator is caused to indicate malfunction. Furthermore, the insertion speed is checked by the speed sensor 41. If the time elapsing between data bits is greater than 0.6 seconds, the system returns to low-power standby operation and indicates a malfunction. In both high power operation and error status operation, a check is made to determine if the coded card is actually inserted and, when the card is removed, the entire system returns to standby status.

In the present exemplary embodiment, the system makes four checks with respect to the motion and direction of motion of the card for each change in the bright-dark pattern, thereby defining four linear reference points.

The apparatus according to the present invention does not require continuous sensing of the data but only that the frequency of relatively short sensing pulses is definitely higher than the occurrence of observable light-dark patterns which could be generated during the most rapid insertion of a coded card. This periodic sensing of the moving light-dark patterns can be used to define light and dark states by the occurrence of two or more sequential light or dark signals.

Because the light-emitting diodes are turned on at full power only approximately 10 percent of the time, it is possible to apply a higher current to them when they are actually energized, resulting in a substantially higher light intensity and yet a very pronounced prolongation of life, for example approximately 10 years. At the same time, the overall energy consumption is reduced.

The detailed circuitry of the various block diagrams of FIG. 4 will now be described in connection with a description of their function during operation of the apparatus.

Figure 6:
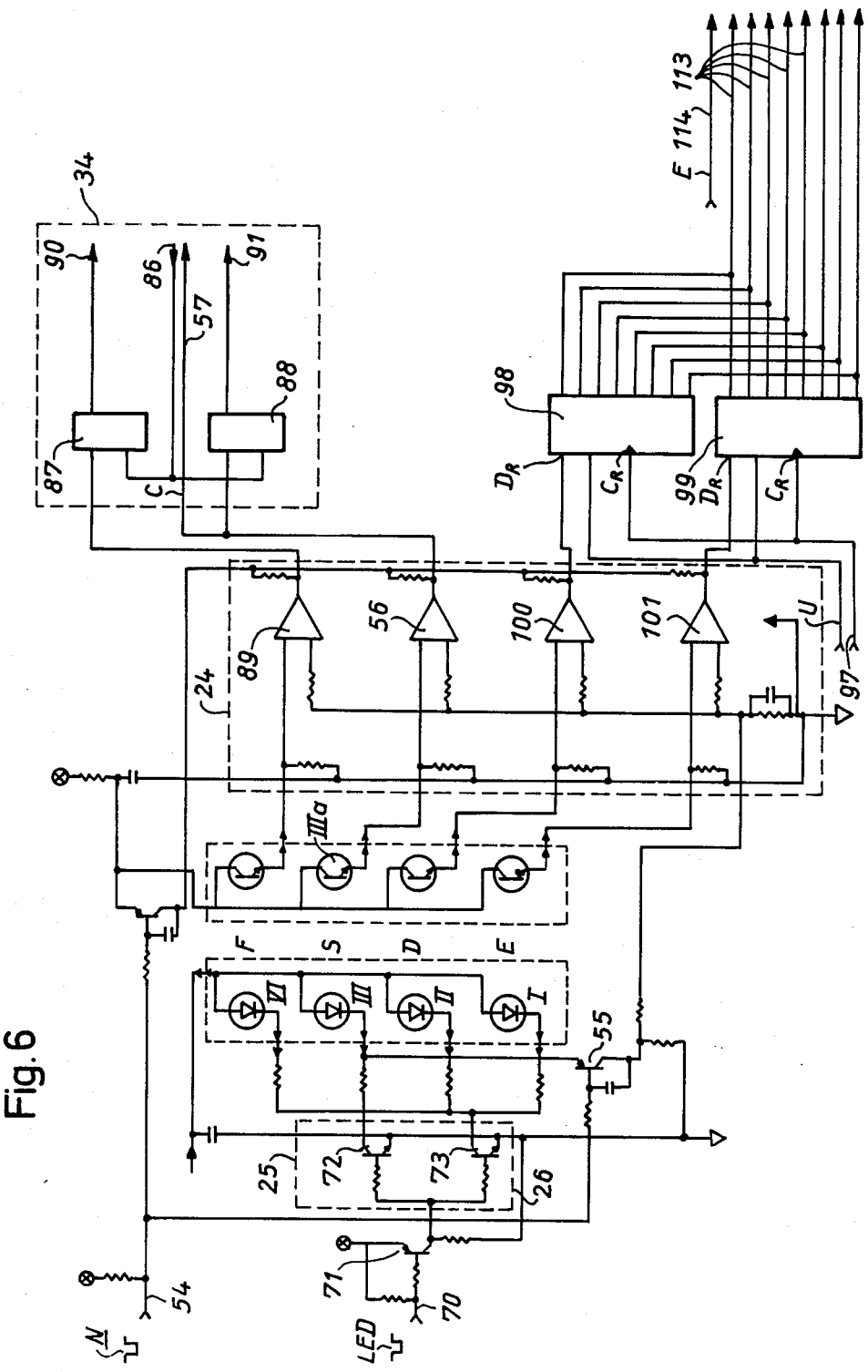
FIG. 6 is a detailed circuit diagram of some of the elements shown as blocks in FIG. 4.
Figure 7:
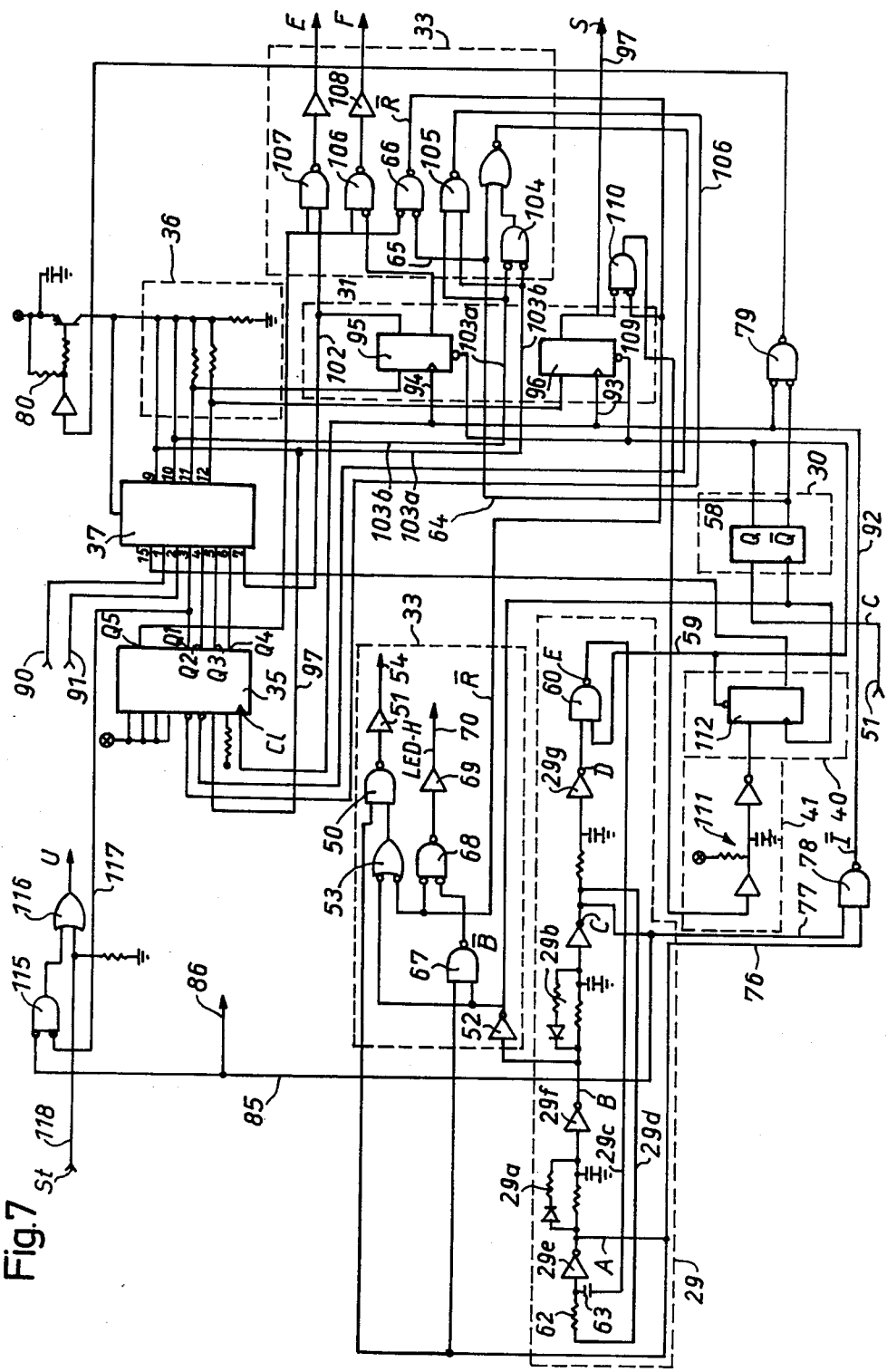
FIG. 7 is a second detailed circuit diagram of further circuit elements shown as blocks in FIG. 4.

The detailed circuit diagrams of the blocks shown in FIG. 4 are given in FIGS. 6 and 7 where circuit elements constituting the functional blocks of FIG. 4 are surrounded by dashed lines and carry the same reference numerals as they do in FIG. 4. It should be noted at this point that the apparatus of the invention could also be used with periodic sensing pulses during standby operation but with continuous full power during the reading cycle, provided that the reading heads are constructed so as to permit such operation. However, it is preferred according to the invention to perform a pulsed operation both during standby and during the reading cycle, not only for the reading head assemblies but for the entire system, especially of these circuit groups which consume relatively high power.

Figure 8:
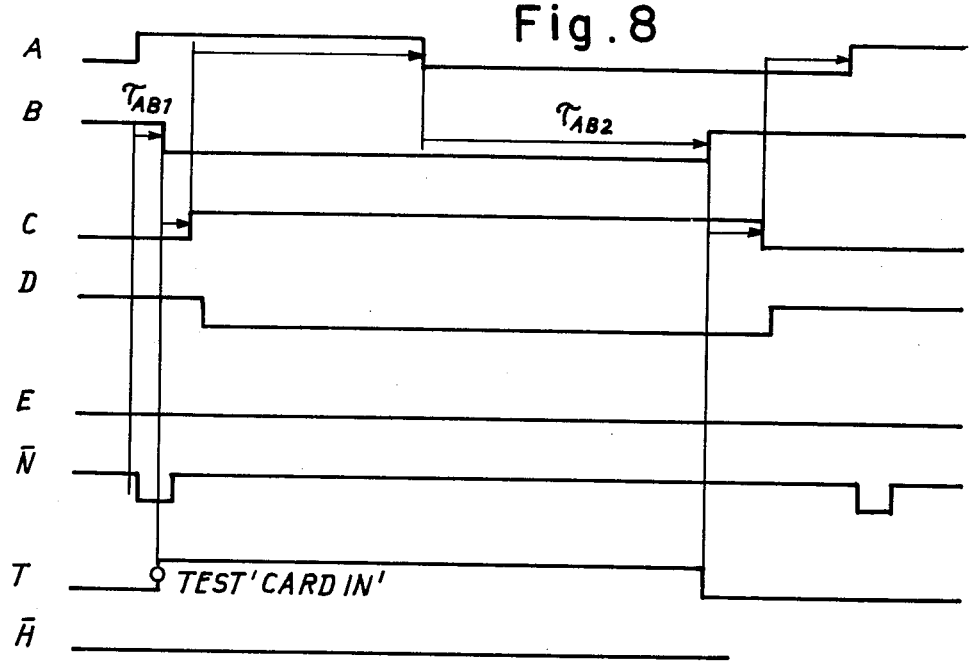
FIG. 8 is a pulse timing diagram illustrating the pulse trains generated by a multi-phase oscillator and other pulse trains when no information carrier is present within the apparatus.
Figure 9:
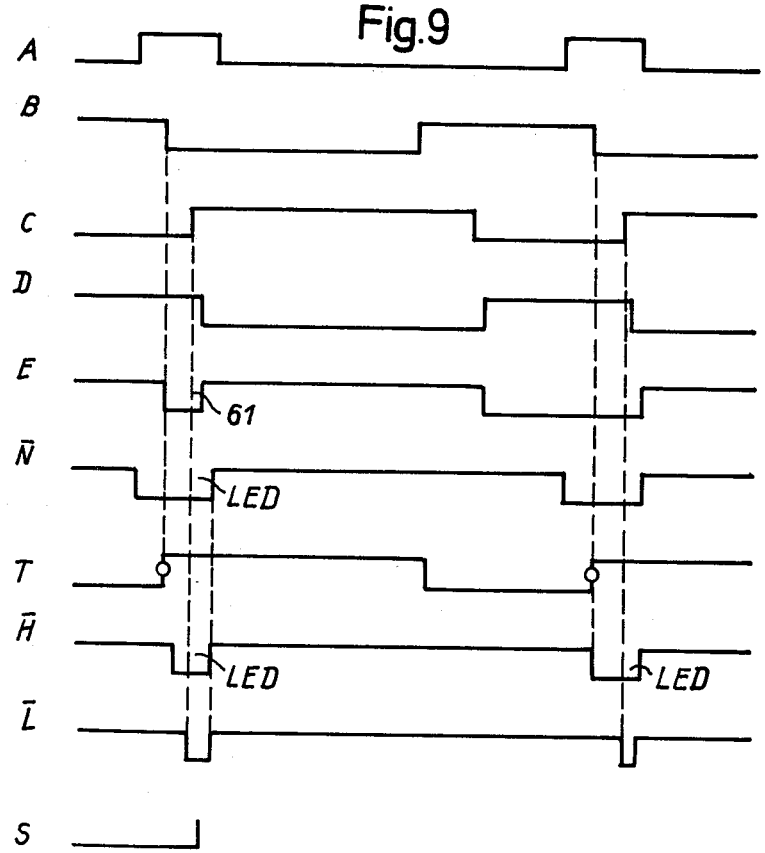
FIG. 9 is a pulse timing diagram similar to that of FIG. 8 when an information carrier is present in the apparatus.

A principal component of the apparatus of the invention is the multi-phase oscillator 29 shown in detail in FIG. 7 which serves to generate the various pulse sequences illustrated in FIGS. 8 and 9 which serve for the selective control and triggering of various circuit elements, for example the pulsed operation of the reading heads, etc., although the pulse trains A, B, C, D and E shown in FIG. 8 and 9 should be regarded as merely exemplary and subject to change according to particular requirements of a given apparatus. The major component of the multiphase oscillator 29 illustrated in FIG. 7 is a cascade of any desired number of Schmidt Trigger, the output of each of which generates a particular one of the previously mentioned pulse trains. These Schmidt Triggers are combined with intermediate circuits 29a, 29b containing diodes which serve to cause time delays in the propagation of output pulses from one flop-flop to the next, depending on the sign of the edge of the pulse. In this way, and further due to the presence of the feedback lines 29c and 29d, a large variety of pulse train patterns may be generated. For example, the positive edge of the pulse train A, which is generated at the output of the first Schmidt Trigger 29e, rapidly triggers the subsequent Schmidt Trigger 29f because the pulse passes quickly through the diode of the subcircuit 29a, whereas the negative edge of the pulse train A resets the output pulse train B of the Schmidt Trigger 29f substantially later. Similar remarks apply to the generation of the pulse train C. The circuit loop is closed for the purpose of generating oscillations via the line 29d. In this manner, there are produced the pulse trains shown in FIG. 8, and these pulse patterns are repeated continuously when at least one of the sensing heads associated with the information carrier determines that no information carrier is present within the region of the reading heads. This determination is made as follows.

Timing Pattern In The Absence Of A Coded Card

As seen in FIG. 7, the B pulse train passes through the inverter 52 and the gate 53 to one input of the gate 50. The gate 50 also receives the pulse train A and the combination of these two pulses causes the generation of a short negative sensing pulse $\overline{N}$ at the point 54 which is applied to the input of a transistor 55, shown in FIG. 6, which causes the activation of a selected light-emitting diode III associated with the reading head assembly S. The presence of a card in the reading slot would prevent the propagation of the light from the diode III to the associated phototransistor IIIa, thereby causing the subsequent comparator 56 to respond and to generate at the point 57 a card signal C which is fed to the D-input of a memory or flip-flop 58 shown in the lower right portion of FIG. 7 at the point 57. The clock pulse train for the D-flip-flop 58 is the $\overline{B}$ pulse train from the inverter 52. Accordingly, the Q-output of the flip-flop 58 carries a signal related to a logical 1 (in the present example) whereas it has a signal related to a logical 0 when the information carrier or coded card is absent.

It should be noted at this point that all of the logical states are merely exemplary indications and it is possible, as is well known to the person skilled in the art, to employ different logical relative switching states to obtain similar or identical overall functioning of the apparatus.

As seen in FIG. 8, approximately half-way in the negative-going portion of the pulse train $\overline{N}$, and as triggered by the edge of the pulse train T which is the inverted pulse train B, a test is made relative to the presence or absence of the information carrier. If this test is negative, i.e., no card is present, the gate 60 connected behind the last Schmidt Trigger 29g of the oscillator 29 remains blocked via the line 59 and the E pulse train remains zero as illustrated in FIG. 8. This cycle is repeated periodically as shown in FIG. 8 until the test for the presence of an information carrier finally becomes positive due to the insertion of a coded card.

Timing Signals When An Information Carrier Is Present

The various pulse trains which occur when a card carrier is present are shown in FIG. 9. In accordance with the above discussion, the presence of a card causes a short pulse 61 within the pulse sequence E which endures as long as the corresponding pulse in the D pulse train lasts. This short pulse 61 and the E pulses which are present when an information carrier is inserted, are fed via the rapid-return line 29c to cause an almost instantaneous switching back of the A pulses compared with the much longer duration of these A pulses as shown in FIG. 8 if the signal is returned via the integrating sub-circuit consisting of the resistor 62 and the capacitor 63. Furthermore, the switchover of the $\overline{Q}$ output of the flip-flop 58 is passed via lines 64, 65 to the gate circuit 66 which thereby switches and causes the generation of the running pulses $\overline{R}$ which open the gates 67,68, pass the inverter 69 and generate the high power actuation pulses LED at the point 70 from the combination of the pulse trains A and $\overline{B}$. These pulses are received at the point 70 in FIG. 6 and are passed through the amplifier chain 71, 73 and the connecting line 74 to the remaining light-emitting diodes I, II and IV which constitute a part of the reading head system while the light-emitting diode III receives a high-powered reading pulse LED from the associated amplifier 72.

The above-mentioned rapid signal return which shortens the A pulse also results in shortening the reading pulses LED whose associated pulse train is labeled $\overline{H}$ in FIG. 9.

Whenever a reading process is terminated, the entire cycle including the actuation of the diode III with a first sensing pulse is repeated.

Only when the presence of an information carrier is sensed, do the diodes I–IV receive the high-powered reading pulses. The control pulse train for the diode III is labeled $\overline{N}'$ in FIG. 9 and it is composed of the sensing pulse $\overline{N}$ of FIG. 8 and the later occurring reading pulse LED corresponding to the pulse train $\overline{H}$.

In summary, the overall sequence of events is to sense the presence of an information carrier and subsequently to generate the high-powered reading pulses LED while at the same time switching to a higher operating frequency.

Activation Of Circuit Components For The Reading Cycle

When the overall circuit contains sub-groups or individual circuits which tend to consume relatively high current, it is advantageous to activate these latter circuits only if the presence of an information carrier has been determined. In the present exemplary embodiment, such a circuit is the program memory 37 in FIG. 7 which is embodied in bipolar technology and thus requires considerably more current than the CMOS circuitry and this circuit is activated only when needed. As will be seen in the pulse timing diagrams of FIG. 9, the reading pulse train $\overline{I}$ is composed of the pulses from the pulse trains A and C, which are fed via lines 76 and 77, respectively, to an AND gate 78 feeding a further AND gate 79 which releases the short reading pulses shown in FIG. 9 to the program storage only if its other input receives a signal indicating the presence of the information carrier from the information carrier indicating flip-flop 58. The PROM 37 is then activated by the amplifier 80. It will be appreciated that other power-intensive circuits might be actuated in this manner or that the actuating circuit can be omitted if the apparatus does not contain power-intensive circuit elements.

Read-out Of Clock Information

The illustration of FIG. 5 shows that the present exemplary embodiment, which is particularly suitable for dynamic pulsed reading, contains a separate clocking or timing track 21 associated with one or more data tracks 22, 23, etc. The exact number of clock tracks and data tracks is arbitrary, but the clock or timing track must be such as to yield enough usable alterations that each of the data bits present in the data tracks can actually be received by the reader. In the present exemplary embodiment of FIG. 5, only a single clock track is provided, which is read out by two reading heads, labeled F and S, respectively, in FIGS. 5 and 6. The other two reading heads, designated D and E, respectively, are used for reading the data on the data tracks. The clock track system has two main tasks and these are 1. the release of the data tracks for reading, once a clear determination has been made that a new bit status has been obtained during the insertion of the information carrier; and 2. to prevent reading when the above condition is not met, i.e., if the last portion defined by the clock track and the associated reading heads S and F and, possibly, by any intermediate memory, all these constituting a "clock generator", has not changed or if a retrograde motion has been determined. Each of the data bits present in the data tracks must be associated with a particular different clock track configuration, whereupon it is fed to the program memory 37, permitting the latter to read the associated bit or bits on the data tracks.

For the purpose of simplification, the exemplary embodiment shown in FIG. 5 has a clock track design formed from alternating bright and dark fields which, together with the disposition of two reading heads F and S whose distance from one another is not equal to the separation of light and dark fields, results in the generation of a four-valued so-called period of the overall clock generator. For this reason, it is possible to move the information carrier backward during the reading process by as many as three clock track values until a fourth identical value is obtained and the system must admit failure and switch over to a malfunction indication.

To illustrate these events, let it be assumed that a relative displacement takes place between the clock track heads F and S and the clock track 21. Two possible positions of the reading heads F and S are shown in the figure, one of these being drawn in solid circles and the other shown in dashed circles. If the passages of the edges of the light and dark fields over the heads are considered as timing events, one obtains the following four states which define a "period" of the clock generator.

|   | Reading Heads | |
|---|---|---|
|   | F | S |
| a | 1 | 1 |
| b | 1 | 0 |
| c | 0 | 0 |
| d | 0 | 1 |

It will be further seen from FIG. 5 that, for each one of these states of the clock generator, the data track reading heads D and E are placed squarely above a light field or a dark field of the bit pattern in the tracks 22 and 23. In the representation of FIG. 5, all of the data fields are shown to be bright, although it will be appreciated that, in reality, a usable bit pattern would normally have a different and essentially arbitrary distribution of light and dark fields.

The pulse train C illustrated in FIG. 9 is used to generate an overall clock signal which is carried on line 85 in FIG. 7 to a point 86 which enters the circuit illustrated in FIG. 6 at a similar point 86 where it is applied to the clock inputs of two receiver flip-flops 87 and 88 which receive the output signals of comparator-amplifiers 89 and 56, associated, respectively, with the clock track reading heads F and S. The outputs 90 and 91, associated, respectively, with the Q outputs of the flip-flops 87 and 88, then carry clock track signals which are fed to inputs 1 and 2, respectively, of the program memory 37 illustrated in detail in FIG. 7.

Evaluation of Read-Out Clock Track Information

The valuation of the read-out clock track information is performed substantially by the previously mentioned program memory 37 and an associated status counter 35. For synchronized, rastered operation, the $\overline{I}$ pulse train formed from the A and C pulse trains and available at the output of the gate 78 is used as a general stepping pulse train which is carried via a line 92 to the clock inputs 93 and 94 of bistable flip-flops 96 and 95 whose purpose will be described below and which is further carried on line 92 to the clock input CL of the status counter 35. The status counter 35 alters its content to the next higher level provided that its EP input receives an appropriate enabling pulse via the line 97. The dimensions of the status counter 35 are such as to correspond to the number of bits in the data track, i.e., in the present case 16 bits. The outputs Q1, Q2, Q3, and Q4 of the status counter 35 are used to transmit the contents of the status counter 35 obtained by the stepping of the program memory 37 back into the latter memory 37 at appropriate address inputs 3, 4, 5 and 6. This address corresponds to the next expected bit pattern in the clock track information if the information carrier is inserted still further into the apparatus for a continuation of the reading of the data. The clock track information is fed to the inputs 1 and 2 of the program memory 37 from points 90 and 91 of the clock register 34 so that the program memory, i.e., the PROM 37, as it will be called below, waits for an appropriate coincidence and only thereafter will it provide appropriate stepping signals, data receipt signals or malfunction signals at its outputs 9, 10, 11 and 12. In other words, the PROM generates a nominal value for the next to-be-expected reading head signal a, b, c and d corresponding to the above-shown table and waits for this nominal value to be delivered to it by the status counter 35 in the form of an appropriate address. If this nominal combination does not appear at its inputs 1 and 2, the PROM 37 enters a holding status and prevents the stepping of the status counter 35 by placing a disabling signal at the enabling input EP of the status counter 35. Initially, let the case be considered in which a "proper", i.e., relatively uniform insertion of the information carrier is performed so that in the normal case the bit pattern generated from the four possible bit patterns of the clock track generator is present at the inputs 1 and 2 of the PROM 37, and that the PROM decides that a coincidence is occurring on the basis of the present address supplied by the status counter 35. In that case, its output 12 generates a shift signal which is fed to the D input of the synchronizing flip-flop 96 which receives the clock pulse through the line 93 for the purpose of rastering the information. The line 97 will then carry a shifting pulse S which is applied at 97 in FIG. 6 to the clock inputs $C_R$ of data registers 98, 99 which permit the data received from the comparators 100 and 101 associated with the reading heads D, E and which are present at the data inputs $D_R$ of the registers 98, 99 to be admitted to these registers. The shifting signal S occurs only once, because, at the same time, the PROM 37 causes the status counter 35 to step up by one step over the line 97, so that the address is changed and a coincidence between the clock track information which may still be present and the new address no longer occurs.

Prevention Of Reading During Retrograde or Irregular Motions Of The Information Carrier It has already been noted that the four different states of which the clock track coding is capable permit the PROM 37 to allow as many as three changes of state during a reverse or retrograde motion of the information carrier and to remember them without causing the entire reading system to enter the failure or malfunction mode. Only when the retrograde motion reaches the fourth state again, which would correspond to the supposedly correct new state, does the PROM 37 give up its efforts and switch over to a failure mode. A sub-memory or marker flip-flop 95 is set by the output 11 of the PROM 37 if the expected clock bit pattern does not occur at its inputs 1 and 2 but rather another one which necessarily corresponds to a reverse or retrograde motion. In that case, the input 7 of the PROM 37 receives a locking signal from the Q output of the marker flip-flop 95 via the line 102, and, as long as this locking signal or retrograde signal is present, the PROM 37 rejects all clock bit pattern or combinations which do not correspond to the pattern which it had reached prior to the setting of the marker flip-flop 95. If a further retrograde motion results in a receipt of the expected clock track pattern while the locking signal is still present, then the outputs 9 and 10 of the PROM generate termination signals which are fed via lines 103a, 103b to gates 104 and 105, respectively. The gate 105, via the line 106', switches the L input of the status counter 35 to "load", which causes the latter to assume the counter status "full" at its output Q5, and this full signal is fed to gates 107 and 106. It will be appreciated that, due to the fact that the Q and $\overline{Q}$ outputs of the marker flip-flop 95 are coupled to the remaining inputs of the gates 107 and 106, respectively, while the marker flip-flop 95 is still set corresponding to the retrograde motion of the information carrier beyond the third permissible pattern, the output of the gate 106 generates an error signal F beyond the inverter 108, whereas, in the opposite case, i.e., if the marker flip-flop 95 has not been set, a termination signal E occurs which controls the orderly and normal termination of the reading operation.

If the information carrier is moved forward again prior to exceeding the clock bit combination which the PROM 37 is able to remember in retrograde motion, then the setting of the marker flip-flop 95 is nullified and the reading operation proceeds without having been affected by any jittering or retrograde motions of the information carrier. During this entire process, the PROM does not put out any shift signal S which alone would have made it possible to store any information from the reading heads D and E.

Malfunction Due To Excessive Delay

An important signal necessary for the function of the overall system is the running signal $\overline{R}$ present at the output of the gate 66. In one of the states of that gate 66, i.e., whenever the Q5 output of the status counter 35 applies a signal indicating a terminated reading process while at the same time the $\overline{Q}$ output of the flip-flop 58 applies a signal indicating the absence of an information carrier at the other input of the gate 66, the running signal $\overline{R}$ permits only low-power or low-current sensing pulses shown in the $\overline{N}$ pulse train of FIG. 8. The running signals $\overline{R}$ enter their other state if an information carrier is present while, at the same time, the status counter 35 is reset to zero or registers a continuing reading process. These running signals, which cause the release of the high-current LED pulses, are applied via a branching line 109 to one input of a gate 110, the other input of which receives the shift signal S from the flip-flop 96, and the output of the gate 110 goes to a timing circuit 111 which expires after a predetermined time interval if no further reading pulses are received, which is the case if the information carrier is not inserted further into the apparatus after an excessive period of time. In that case, the next clock pulse of the sequence $\overline{B}$, which corresponds to the T sequence of FIG. 8, sets a flip-flop 112 which applies to the input 15 of the PROM 37 a time expiration signal, causing the PROM 37 to generate output signals for terminating a reading process similar to the occurrence of a malfunction signal F. The timing circuit 111 may be of any suitable design and is represented by an RC element in the exemplary embodiment shown.

Transfer Of Data Track Information

In the exemplary embodiment illustrated, each data track is 16 bits long, although this number is arbitrary. Furthermore, a given clock track may be associated with any number of data tracks which are read out in parallel whenever the data track control generates an appropriate reading signal S. It is advantageous if the intermediate registers 98, 99 are double registers in which the contents of the first register are transferred by a transfer signal U either in parallel or in series into the second register after the eighth step, whereupon the first register receives the second half of the data track information. The interrogation and further processing of the data which are stored on the data track in the form of a bit pattern takes place via the output lines 113, i.e., eight bits at a time in parallel in overall serial interrogation. This manner of transfer is arbitrary in principle, as is the manner of treating the collected information from the data track. The data transfer can take place if the line 114 carries the termination signal E from the output of the gate 107, indicating a properly terminated reading process. The transfer signal U is formed from the combination of gates 115, 116 shown in the top left of FIG. 7, which receives a signal indicating the eighth step from the outpt Q1 of the status counter 35 via line 117, as well as receiving the clock signal via the line 85. The gate 116 is also shown to receive a strobe signal St on the line 118 coming from a further data processing system not illustrated.

Second Exemplary Embodiment Of The Apparatus

Figure 10:
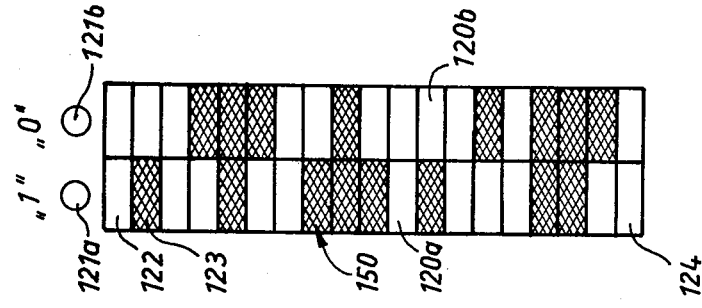
FIG. 10 illustrates a second exemplary embodiment of an information carrier having self-clocking code tracks.

The second exemplary embodiment of the information carrier shown in FIG. 10 illustrates a self-clocking code track having at least two, and generally only two, code tracks for a binary system. These two code tracks, respectively labeled 120a and 120b, are so formed that a change of the value takes place after each bit on one or the other of the two tracks 120a, 120b, but where a simultaneous change on both halves of the code track is not permitted. The basic principle of this exemplary embodiment is that one of the code tracks, for example, 120a, has the logical value 1, whereas the other code track, for example, 120b, has the logical value 0. Accordingly, when the possibility of self-clocking, independently of the insertion speed and including the possibility of stops and even reverse motion, is taken into account, the customary 16 bits on each code track result in an overall number of 65,536 possible code patterns. Each of the code tracks 120a, 120b has an associated reading head 121a, 121b. In the exemplary embodiment, the overall coded and stoed information corresponds to a particular number or digit which is tested by an evaluation circuit, to be further discussed with respect to FIGS. 11 and 12, for generating appropriate control signals, for example, for opening a lock. In such a case, the information carrier which carries the two code tracks 120a, 120b represents a kind of key which might also be inserted into the locked opening carrying the reading heads 121a, 121b in the opposite orientation.

As already pointed out in the exemplary embodiment shown, a change must take place in either the right or left code track 120a, 120b after each bit. By sensing the occurrence of positive- or negative-going edges of the pulses generated by the reading heads, it is possible to realize the principle of self-clocking. Each pulse edge signal is a clock signal and can be used, for example, for shifting a shift register which receives the detected data and may reproduce it, for example, in parallel. The shift register is filled with the bit pattern derived from the two code tracks by assigning to each change in the parity of the left code track the status of a logical 1, while assigning to each parity change in the right code track 120b the status of a logical 0. The information carrier illustrated in FIG. 10 also includes a starting bit 122 followed by a directional bit 123 for insuring that even when the information carrier (key, coding card, etc.) is inserted in the opposite direction, the coded information will be read out in the proper sense. At the end of the tracks there is provided a stop bit 124.

The starting bit 122, which in this case consists of a bright segment on both tracks, permits the reading apparatus to anticipate a coded track. The directional bit 123 indicates the direction in which the code is to be read. The directional bit has a bright segment on one track and a dark segment on the other, and the dark segment may be associated, for example, with the code track 120a, which has the value of a logical 1.

The embodiment of the data carrier shown in FIG. 10 may be used in association with many of the circuit systems illustrated in FIGS. 3-9 and described above. Furthermore, in this embodiment, the coded information including the clock information may be read out in pulsed operation. However, a standby operation may be maintained by the generation of very weak sensor pulses as described above, and to shift to a continuous reading operation which will be explained below.

Continuous Readout For The Second Embodiment

Figure 11:
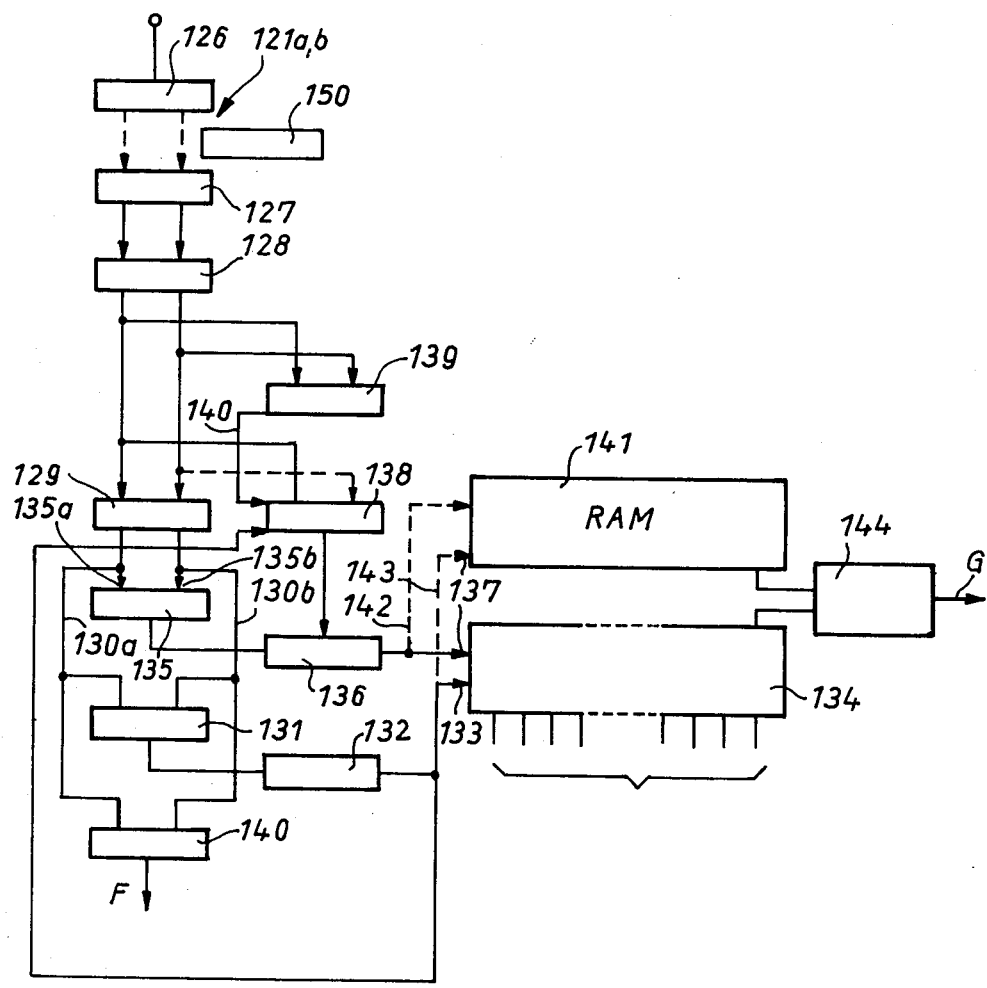
FIG. 11 is a block diagram of a first exemplary embodiment for a processor circuit associated with the information carrier of FIG. 10.

A first variant of the apparatus for reading the code carrier of FIG. 10 is illustrated in FIG. 11 and is seen to include the two aforementioned reading heads 121a, 121b consisting of two light sources 126 and two light receivers 127, respectively embodied as light-emitting diodes and phototransistors. The signals from the two light receivers 127 are preamplified at 128 and pass to edge detectors 129, which recognize a change in signal levels, i.e., a change from light to dark and vice versa in the two code tracks. The edge detectors generate output signals which are fed via lines 130a, 130b to an OR gate 131 and together they form a clock pulse sequence which permits the evaluation of the data bits. The clock pulse sequence is transmitted via a delay member 132 to the transfer input 133 of a register 134 that stores the data pattern. The data are received by an intermediate register 135, constituted by an RS flip-flop in the present embodiment, and so connected that it changes its status only if a previous triggering at one of the inputs 135a, 135b is followed by a triggering at the other input. Any sequential trigger pulses at the same input result in no switching of the flip-flop 135. It will be appreciated that the clock pulse sequence automatically shifts the shift register 134 and, depending on the distribution of data bits on the two code tracks 120a, 120b, the output of the intermediate register 135 constitutes the logical states which result from the distribution of bright and dark fields in the code tracks. These signals are fed via a further gate, preferably an exclusive OR gate 136, to the data input 137 of the shift register 134. It is the property of the exclusive OR gate to change the parity or value of the output signal from the intermediate register 135, while addressing a direct onal register 138 which is set by the first directional bit 123 on the code carrier 120. Depending on which of the tracks 120a, 120b carries the directional bit, the output signal of the directional register 138 is changed. The register 138 may be a simple flip-flop, and its effect is to cause the correct evaluation of the distribution of light and dark fields, i.e., as a logical 0 or a logical 1, to be fed into the shift register 134 in accordance with the output of the exclusive OR gate 136.

In FIG. 10, the code pattern from the data bits generated by the distribution of light and dark fields is shown adjacent to the code tracks.

The directional register 138 is released in the first instance by a start register 139 via a line 140 whenever the start register 139, which may be a simple gate, recognizes the starting bit 122 on both tracks of the data carrier. Similarly, the starting register 139 may take over the transfer of the read-out data information, the resetting of the memory and the preparation for the next reading operation after the termination of the reading process and the arrival of the stop bit 124. In general, it should be pointed out that the basic principle illustrated in the exemplary embodiment of FIG. 11 is intended only to explain the overall design in principle, and the person skilled in the art is able to use the information contained in the previous detailed circuits for providing a system suitable for the second exemplary embodiment of the data carrier according to FIG. 10. The circuit of FIG. 11 may include a timing circuit 140 which generates a malfunction signal when no edge signal is present for a predetermined amount of time.

In a particularly preferred version of the apparatus, it is possible to avoid preliminary storage of the bit pattern carried by the information carrier and to use the first insertion of the information carrier to set the reading device to the specific bit pattern exhibited by that particular information carrier in a permanent way. For this purpose, the circuit of FIG. 11 includes a so-called random access memory (RAM) which receives both data and clock signals during a first reading via connecting lines 142, 143. The memory 141 retains these data permanently, unless a special reset circuit is activated. A coincidence circuit 144 associated with the shift register 134 and the RAM 141 serves to indicate the recognition of the correct data bits by comparing the contents of the shift register 134 with those of the memory 141 after the arrival of the stop bit and to generate an acceptance signal G when coincidence is obtained.

Data Readout In Pulsed Operation

Figure 12:
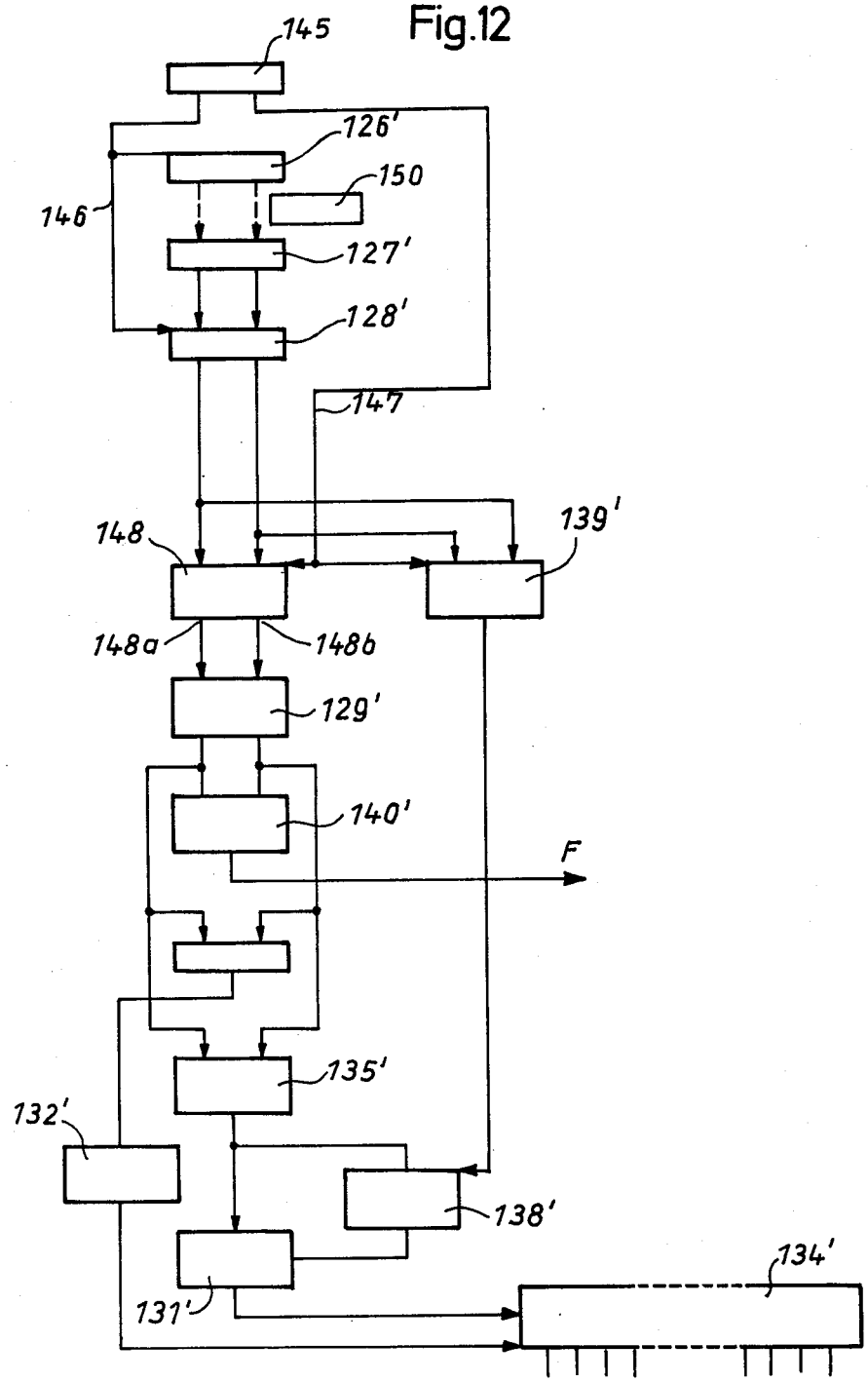
FIG. 12 is a block circuit diagram of a second embodiment of a processor circuit associated with the information carrier of FIG. 10 but suitable for pulsed operation.

If the exemplary embodiments of FIGS. 10 and 11 are to be used for reading data in pulsed operation of the reading heads, which is a manner of operation that has many advantages, especially resulting in increased life and low current consumption, it is only required to supply a supplementary clock generator 145, shown in FIG. 12, which may be embodied, for example, in the manner of the multi-phase oscillator 29 of the first exemplary embodiment and which cooperates in similar manner with the pulse selection processor 33. The pulse generator 145 applies appropriate pulses to the reading head system via the line 146, while a second line 147 leads to an intermediate storage 148 required to perform pulse operation. The intermediate storage, which may consist of two flip-flops, each assigned to receiving information from one of the two coded tracks, generates pulse trains at its outputs 148a, 148b which may be used by the edge detectors 129'. Each of the flip-flops in the intermediate storage 148 is triggered into its respective second state by the change of signals at its input. The remaining circuit elements of the variant of FIG. 12 are not discussed in further detail, because they correspond substantially to those in the embodiment of FIG. 11 and carry the same reference numerals, except for a prime symbol. The pulses carried by the line 147 to the intermediate storage 148 and to the starting register 139' cause the transfer of the information present at the data inputs when that information has changed. It should be noted that the information carrier in the illustrations of FIGS. 11 and 12 is identified by the numeral 150 and may be, for example, an identification card, a coded card, a key, or the like.

A conspicuous advantage of the apparatus described by the foregoing specification is that individual circuit groups and even large, coherent electronic components which cooperate functionally may also be replaced by an appropriately programmed microprocessor or a similar device, and the use of such a microprocessor is considered to be completely within the frame and scope of the present invention.

The read-only memory 141 shown in FIG. 8 may also be replaced by any memory whatever. Preferably, it may be set in parallel so that, in contrast to the representation of FIG. 11, the initial setting, i.e., programming to a particular data pattern, causes the information to be received initially in the shift register, from which it is transferred in parallel to the memory 141.

The foregoing description relates to merely preferred exemplary embodiments and variants of the present invention, it being understood that other embodiments are possible within the spirit and scope of the invention.

What is claimed and desired to be secured by Letters Patent of the United States is:

1. In an opto-electronic apparatus for reading coded data from a data carrier that may be moved with respect to said apparatus for presentation thereto of the data which is represented by patterns of areas, each area being either transparent (bright) or opaque (dark) to the passage of radiation, and said apparatus including at least one reading assembly consisting of a source of radiation and an associated receiver of radiation and further including means for guiding said data carrier along a predetermined longitudinal path relative to said at least one reading assembly so that radiation from said source may pass through the transparent ones of said pattern areas to be received by said at least one radiation receiver and said apparatus still further including electronic data processing means for evaluating the data on said data carrier, the improvement wherein:

said data carrier is provided with a plurality of longitudinally extending tracks of pattern areas, each of said tracks having associated with it at least one reading assembly, said plurality of tracks including at least one data track containing stored data bits and at least one clock track containing a plurality of adjacent alternately arranged transparent and opaque pattern areas, each pattern area of said at least one clock track constituting a clock bit, each clock bit having the same longitudinal dimension as every other clock bit, said at least one clock track having associated therewith at least two longitudinally spaced clock reading assemblies, each generating a clock bit signal corresponding to an adjacent one of said clock bits, said clock bit signals together constituting a clock sequence of different clock bit patterns, the longitudinal distance between adjacent clock track reading assemblies exceeding said clock bit longitudinal dimension and being preselected so that, as said data carrier is moved along said predetermined longitudinal path with respect to said apparatus for a distance equal to at least twice said clock bit longitudinal dimension, said clock track reading assemblies generate a clock sequence having at least four different clock bit patterns corresponding to equal portions of the distance said data carrier is moved relative to said apparatus, each data bit of each data track being associated with a particular clock bit pattern of said clock sequence; and said data processing means includes a memory holding a first predetermined clock sequence program corresponding to a first clock sequence generated by said clock track reading assemblies as said data carrier is moved along said predetermined longitudinal path with respect to said apparatus in a first direction; and said data processing means further includes data track evaluating means and comparison means for comparing the clock sequence generated by said clock track reading assemblies with said first predetermined clock sequence program, said comparison means delivering a disabling signal to said data track evaluating means whenever the clock sequence generated by said clock track reading assemblies differs from said first predetermined clock sequence.

2. An apparatus as defined by claim 1, further comprising a data carrier recognition register (30) for distinguishing, by means of low power sensing pulses applied preferably to only a single reading assembly, between a standby operation and a reading operation employing relatively high powered reading pulses or continuous powering of all reading assemblies, said data carrier recognition register (30) providing an output pulse applied to a multi-phase oscillator (29) which generates a plurality of differing control pulse trains, and means for performing said reading operation at a higher pulse frequency than said standby operation and means for high-power reading pulses (LED) to follow a sensing pulse which detects the presence of said data carrier.

3. An apparatus as defined by claim 2, wherein the output pulse of said information carrier or data carrier recognition register (30) is applied to a gate (79) for generating short actuation power pulses for those circuit groups (Program memory 37) requiring relatively high power during continuous operation and wherein said gate (79) receives short clock pulses ($\bar{I}$) from said multi-phase oscillator (29).

4. An apparatus as defined by claim 1, wherein said reading assembly and said data processing means are disposed on a plurality of printed circuit boards (7, 8, 9, 10) disposed in mutually parallel configuration one on top of the other on a frame member (1) of said apparatus provided with a card receiving slot (2), two of said circuit boards (8,9) being disposed above and below, respectively, said insertion slot (2) and constituting said guide means for guiding said data carrier with respect to said apparatus.

5. An apparatus as defined by claim 1, further comprising a clock register (34) for receiving the pulses generated by said clock track, said clock register (34) being connected to control a program memory (37), having associated therewith a status counter (35), said program memory (37) causing said status counter (35) to advance by one step upon the receipt of a new clock pulse causing a renewed reading of data, said status counter (35) generating an address for said program memory (37), said address constituting information regarding the nature of the next clock track pattern to be expected in the next following reading operation in orderly manipulation of said data carrier with respect to said apparatus.

6. An apparatus as defined by claim 5, further comprising a status register (31) consisting of a plurality of storage units (95, 96) said status register being connected to the ouputs of said program memory (37) and being clock pulse-controlling by short clock pulses ($\bar{I}$) generated by said multiphase oscillator (29), said status register (31) causing shifting pulses (S) to be applied to a shift register consisting of sub-registers (98,99) connected behind the reading assemblies (D,E), whenever a data carrier (150) is determined to be present.

7. An apparatus as defined by claim 6, wherein said status register includes a marker memory (95) which is set by said program memory (37) whenever said program memory (37) receives a clock pattern which does not correspond to the expected clock pattern and implying retrograde motion of said data carrier with respect to said apparatus; whereby the absence of a shifting pulse (S) prevents the occurrence of a read-out of the corresponding information on said data carrier.

8. An apparatus as defined by claim 6, wherein the assembly consisting of said program memory (37) and said status counter (35) contains a stored pulse sequence program permitting said program memory (37) to recognize if the clock bit pattern to be expected during correct insertion of said data carrier has been read or if an interruption of the motion or retrograde motion of said data carrier has occurred.

9. An apparatus as defined by claim 8, wherein the clock track (21) of said data carrier is a simple alternating bright-dark pattern, and wherein, when said data carrier is moved in retrograde motion, said marker register (95) is set, thereby permitting three backward clock steps of said data carrier without causing a determination of malfunction; whereby, when a clock bit pattern is subsequently received which corresponds to the clock bit pattern which was originally expected, and said marker flip-flop (95) is set, a malfunction is determined.

10. An apparatus as defined by claim 9, wherein, when a malfunction is detected, said program memory (37) provides to said status counter (35) a control pulse causing said status counter (35) to register A full counter, said control pulse also being applied simultaneously to two gate circuits (106, 107); whereby when said marker flip-flop (95) is set, a malfunction signal (F) is generated whereas when said marker flip-flop (95) is not set, and said status counter is stepped in proper fashion, there is generated a reading termination pulse (E).

11. An apparatus as defined by claim 10, further comprising a time monitor circuit (41) for monitoring the period occurring between shift pulses (S), which, when a predetermined period thereof is exceeded, generates a signal for said program memory (37) to produce an error signal.

12. An apparatus as defined by claim 11, further comprising gate circuits (78,79,110, 104,105,66,106,107,115,116) and clock registers (112, 58,95,96,34) for synchronizing the frequency-altered output pulse trains (A,B,C,D) produce by said multiphase oscillator (29) during the presence of a data carrier with the control pulse trains (E, $\overline{N},T,\overline{H}, \overline{I}$) derived therefrom so as to force-synchronize the pulse-operated reading and standby operation, thereby preventing a repetition of the read-out of identical information when the data carrier is moved slowly with respect to the apparatus and the pulse repetition rate is rapid.

13. An opto-electronic apparatus for reading coded data from a data carrier that may be moved with respect to said apparatus for presentation thereto of the data which is represented by patterns of areas, each area being either transparent (bright) or opaque (dark) to the passage of radiation, and said apparatus including at least one reading assembly consisting of a source of radiation and an associated receiver of radiation and further including means for guiding said data carrier relative to said at least one reading assembly so that radiation from said source may pass through the transparent ones of said pattern areas to be received by said at least one radiation receiver and said apparatus still further including electronic data processing means for evaluating the data on said data carrier, and wherein the improvement comprises:
    means for operating said at least one reading assembly in at least two different operational modes, a first standby mode wherein only one of said at least one reading assemblies is supplied at intervals related to the speed of movement of said data carrier with respect to said apparatus with short low power sensing pulses and a second reading mode in which all of the reading assemblies in said apparatus are provided with pulses adjusted to the maximum reading speed and having relatively high power for carrying out the reading operation.

14. An apparatus as defined by claim 13, including means for operating the electronic supply and data processing circuits in at least two different operational states with respect to power consumption, a first standby operation in which at least one reading assembly (S) is supplied with short low power sensing pulses occurring at maximum intervals related to the speed of movement of said data carrier with respect to said apparatus and a second reading operation in which all of the reading assemblies in said apparatus are supplied with pulses occuring at smaller intervals adjusted to the maximum reading speed and with relatively high reading power.

15. An apparatus as defined by claims 13 or 14, wherein the amplitude of the reading pulses in the reading operation is substantially higher than the amplitude of pulses for standby operation and the frequency of occurrence of said power pulses is adjusted to the maximum reading speed.

16. An apparatus as defined by claim 13, comprising means for shutting down power-intensive circuit groups of said data processing means in said standby operation and for applying thereto clock pulses during reading operation whose length is a fraction of the length of said reading pulses.

17. An apparatus as defined by claim 13, wherein the switchover from standby operation to reading operation takes place automatically in dependence on the absence of a clock pulse at at least one of said reading assemblies (S).

18. An apparatus as defined by claim 13, wherein the stored clock sequence program includes one pulse sequence corresponding to the correct insertion movement of said code carrier in said apparatus and a second pulse sequence related to a removal motion of said data carrier from said apparatus whereby each forward or backward step is identified and the data track evaluating means are accordingly enabled or disabled.

19. An apparatus as defined by claim 13, including means for returning the reading assemblies and the data processing means to standby operation immediately after the termination of a reading operation and also immediately after the recognition of a reading error.

20. In an opto-electronic apparatus for reading coded data from a data carrier that may be moved with respect to said apparatus for presentation thereto of the data which is represented by patterns of areas, each area being either transparent (bright) or opaque (dark) to the passage of radiation, and said apparatus including at least one reading assembly consisting of a source of radiation and an associated receiver of radiation and further including means for guiding said data carrier along a predetermined longitudinal path relative to said at least one reading assembly so that radiation from said source may pass through the transparent ones of said pattern areas to be received by said at least one radiation receiver and said apparatus still further including electronic data processing means for evaluating the data on said carrier, the improvement wherein;
    the data on said data carrier (150) consist of two longitudinally extending partial code tracks (120a, 120b), each containing an arbitrary sequence of bright and dark areas having lateral and transverse edges, said two tracks containing the data to be processed by said apparatus and at the same time constituting the clock track for the system, the code tracks being so disposed that for each data step, one or the other of the bits in said code tracks will change, the change thereof constituting the occurrence of a logical state (1)) for bit changes in one of the tracks and a logical state (0) for a bit change in the other track, whereby the occurrence of bit changes in one or the other tracks is interpreted as a sequence of logical states constituting a clock sequence;
    each of said coded tracks is associated with a single reading assembly (121a, 121b) whose output signals are fed to transverse edge detectors (129) generating output signals either on each bright going or on each dark going edge, said output signals being combined in a gate circuit (131) and constituting the shifting cycle for the shift input of a shift register (134, 134');
    the output signals of the edge detectors (129) are further provided to switching inputs of a data evaluating storage circuit (135) whose output is connected to the data input (137) of the shift register (134), whereby the data bit pattern is received in the shift register (134, 134') in accordance to the clock sequence received at the shift input of said shift register; and

- a coincidence circuit (144) determines the coincidence of the contents of the shift register (134) and the contents of a memory holding predetermined data information.

21. An apparatus as defined by claim 20, wherein the initial data bits of the two code tracks (120a, 120b) constitute an initial directional bit (123) and wherein a change of the value of successive bits in one of the tracks constitutes a change of the predetermined logical state assigned to that track; whereby the data on said two tracks may be read out independently of the orientation of said data carrier.

22. An apparatus as defined by claim 21, further comprising a starting bit common to both code tracks followed by a stop bit (124) located at the end of the information-containing data, the stop bit (124) also being associated with both code tracks.

23. An apparatus as defined by claim 20, further comprising one or more additional code tracks, and wherein each change in one of the totality of coded tracks constitutes a change of the basic code, (ternary code, quaternary code, etc.).

24. An apparatus as defined by claim 20, wherein the direction of motion of said code carrier is determined by a directional register (138,138') triggered by the directional bit (123) on said code carrier, the output of said directional register (138,138') being provided to an inverting gate (136) whose input receives information from said data register (135) and whose output is connected to the data input (137) of said shift register (134,134').

25. An apparatus as defined by claim 24, wherein the output signals of the two edge detectors (129) are used to generate the shift cycle for the shifting input (133) of the shift register (134) which is applied thereto via a delay circuit (132).

26. An apparatus as defined by claim 25, further comprising a time monitor circuit (140) triggered by each of the output signals of said edge detectors (129), for generating a malfunction signal (F) when the period between detected edges increases beyond a predetermined limit.

27. An apparatus as defined by claim 20, wherein said memory is a programmable memory (141) connected to the output of the circuits (129,140,135) which generate the shift clock cycle and the data information so that, during an initial insertion of the data carrier, the read out coded information is permanently received in said memory (141) and wherein, during any subsequent insertion of the data carrier (150), coincidence circuit (144) determines the coincidence of the contents of said memory (141) with the contents of said shift register (134).

28. An apparatus as defined by claim 20, further comprising a clock generator (145) for generating control pulses used to actuate the reading assemblies (126',127') and other processing circuits for performing the pulsed read-out of data bits and clock information from the two coded tracks (120a, 120b) of the information carrier (150) and further comprising an intermediate memory (148) connected ahead of said edge detectors (129') for receiving the read out information.

* * * * *